US012659563B2

(12) United States Patent
Lee et al.

(10) Patent No.: US 12,659,563 B2
(45) Date of Patent: Jun. 16, 2026

(54) CAMERA MODULE

(71) Applicant: LITE-ON TECHNOLOGY CORPORATION, Taipei (TW)

(72) Inventors: Yuan-Yu Lee, Taipei (TW); Chih-Hsuan Shih, Taipei (TW); Kun-Ta Ho, Taipei (TW); Chih-Hao Tsai, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 42 days.

(21) Appl. No.: 18/829,349

(22) Filed: Sep. 10, 2024

(65) Prior Publication Data

US 2025/0247596 A1 Jul. 31, 2025

(30) Foreign Application Priority Data

Jan. 25, 2024 (CN) .......................... 202410105015.8

(51) Int. Cl.
H04N 23/55 (2023.01)
H04N 23/51 (2023.01)

(52) U.S. Cl.
CPC ............. H04N 23/55 (2023.01); H04N 23/51 (2023.01)

(58) Field of Classification Search
CPC ................................ H04N 23/55; H04N 23/51
See application file for complete search history.

(56) References Cited

U.S. PATENT DOCUMENTS

| | | | | |
|---|---|---|---|---|
| 11,079,327 | B2 * | 8/2021 | Pizzi ...................... | G01N 21/43 |
| 2006/0038668 | A1 * | 2/2006 | DeWard .................. | B60R 11/04 |
| | | | | 340/438 |
| 2015/0015713 | A1 * | 1/2015 | Wang ...................... | B60R 11/04 |
| | | | | 348/148 |
| 2015/0042798 | A1 * | 2/2015 | Takeda .................... | B60R 11/04 |
| | | | | 348/148 |
| 2016/0142596 | A1 * | 5/2016 | DePaschoal ........... | H04N 23/63 |
| | | | | 348/38 |
| 2018/0288291 | A1 * | 10/2018 | Shimizu ............... | G02B 13/006 |
| 2020/0017037 | A1 * | 1/2020 | Masui .................... | H04N 23/55 |
| 2021/0099625 | A1 * | 4/2021 | Potter .................... | H04N 23/56 |
| 2021/0123778 | A1 * | 4/2021 | Chun ..................... | G01D 11/30 |

* cited by examiner

*Primary Examiner* — Abdelaaziz Tissire
(74) *Attorney, Agent, or Firm* — WPAT, PC

(57) ABSTRACT

A camera module includes a housing including a first housing, wherein the first housing includes a body portion and a first protruding portion, and the body portion and the first protruding portion are integrally formed; the first protruding portion is disposed in an inner side of the body portion, an outer side of the body portion is a mounting surface for mounting to an object, and the inner side is opposite to the outer side; a first circuit board disposed on the first protruding portion, a photo sensor disposed on a first surface of the first circuit board, wherein a first angle is formed between the first circuit board and the mounting surface, the first angle is greater than 0 degrees and less than 90 degrees; and a lens disposed on the first surface of the first circuit board and corresponding to the photo sensor.

14 Claims, 4 Drawing Sheets

10

D1D3

D2

CF2          CF1

160

110

10

D3

D1          D2

132   130   112   126   124   120   152

154

118

142

110

114          140

CAMERA MODULE

This application claims the benefit of People's Republic of China patent application Serial No. 202410105015.8, filed Jan. 25, 2024, the subject matter of which is incorporated herein by reference.

BACKGROUND OF THE INVENTION

Field of the Invention

The invention relates in general to a camera module, and more particularly to a camera module including a housing.

Description of the Related Art

In recent years, the demand for camera modules has continued to increase. For example, in the automotive market, it is also necessary to use camera modules to capture images of the interior or exterior of the vehicle. When the camera module is installed inside the vehicle, it often faces the problem of insufficient space. Therefore, there is still an urgent need to develop a camera module that takes up less space.

SUMMARY OF THE INVENTION

The invention is directed to a camera module. Since a first angle is between a first circuit board and a mounting surface in the camera module, an optical axis of lenses in the lens disposed on the first circuit board can be adjusted to a proper position through the first angle.

According to an embodiment of the present invention, a camera module is provided. The camera module includes a housing including a first housing, wherein the first housing includes a body portion and a first protruding portion, and the body portion and the first protruding portion are integrally formed; the first protruding portion is disposed in an inner side of the body portion, an outer side of the body portion is a mounting surface for mounting to an object, and the inner side is opposite to the outer side; a first circuit board disposed on the first protruding portion, a photo sensor disposed on a first surface of the first circuit board, wherein a first angle is formed between the first circuit board and the mounting surface, the first angle is greater than 0 degrees and less than 90 degrees; and a lens disposed on the first surface of the first circuit board and corresponding to the photo sensor.

The above and other aspects of the invention will become better understood with regard to the following detailed description of the preferred but non-limiting embodiment(s). The following description is made with reference to the accompanying drawings.

DETAILED DESCRIPTION OF THE INVENTION

Each embodiment of the present invention will be described in detail below, with drawings as examples. In addition to these detailed descriptions, the present invention can also be widely implemented in other embodiments. Easy substitutions, modifications, and equivalent changes of any described embodiments are included in the scope of the present invention, and the scope of the present invention is determined by the claims of the present invention. In the description of the specification, many specific details and implementation examples are provided to enable readers to have a more complete understanding of the present invention; however, these specific details and implementation examples should not be regarded as limitations of the present invention. In addition, well-known steps or elements are not described in detail to avoid unnecessary limitations of the present invention.

Figure 1A:
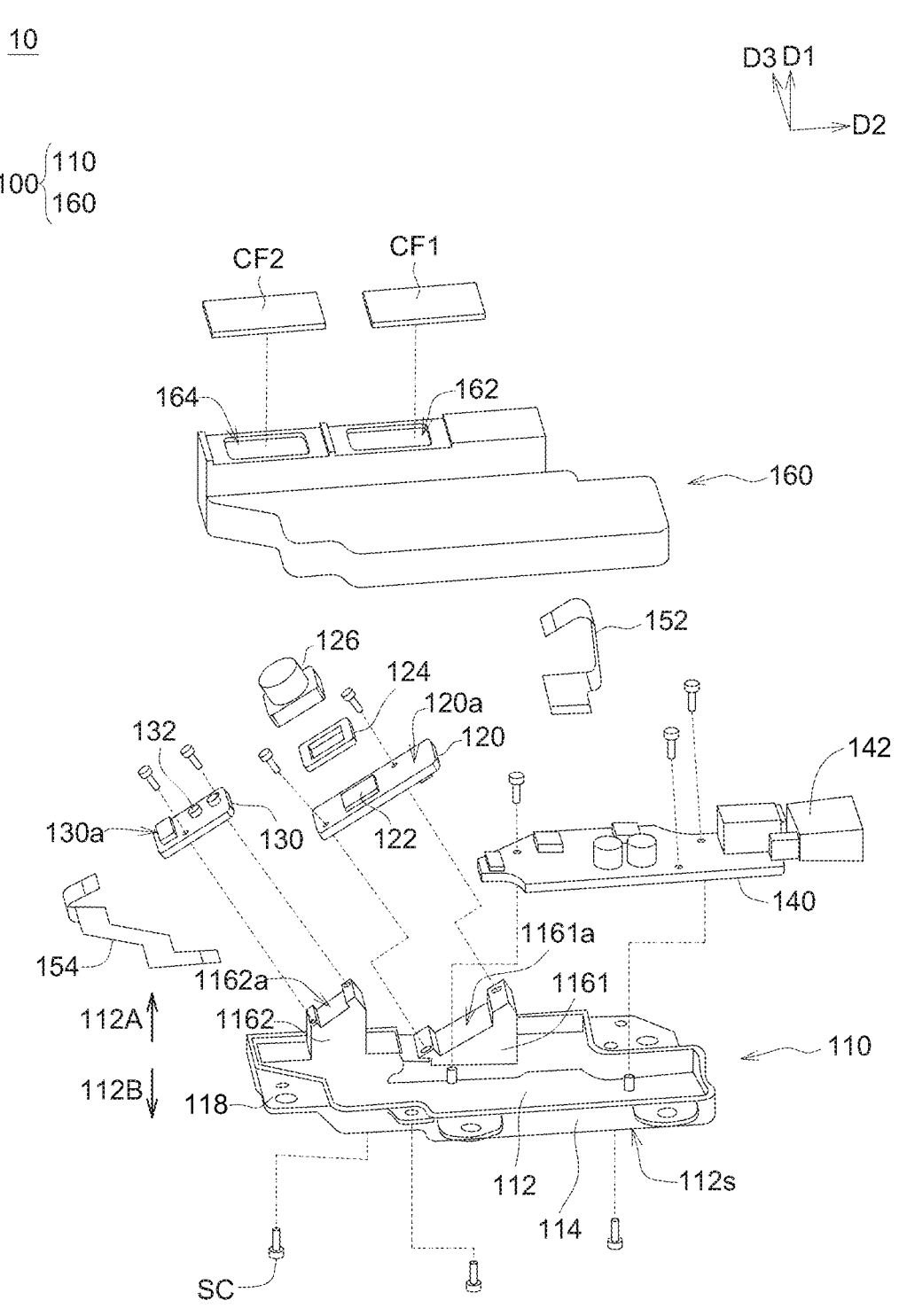
FIG. 1A shows an exploded view of a camera module according to an embodiment of the present invention.
Figure 1B:
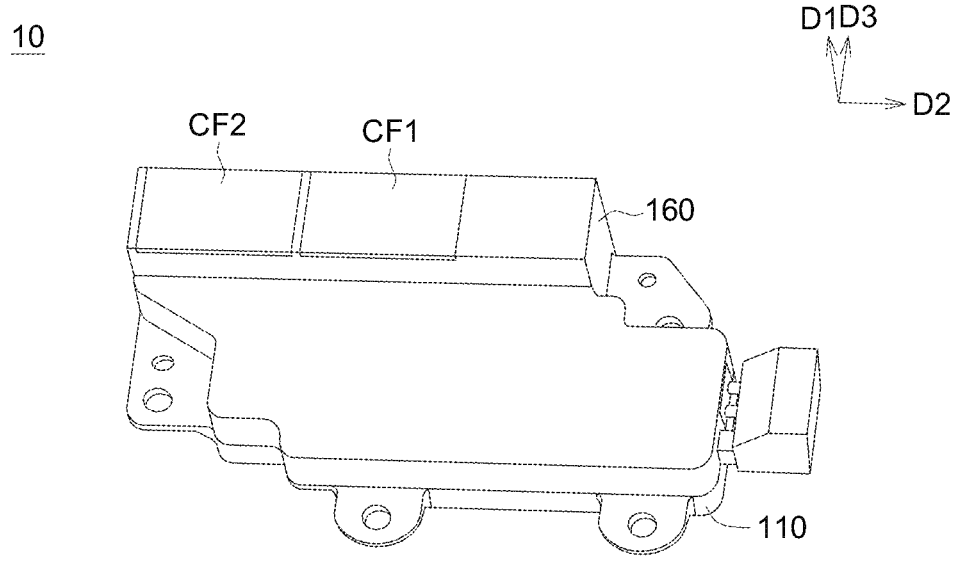
FIG. 1B is a three-dimensional view of a camera module according to an embodiment of the present invention.
Figure 1C:
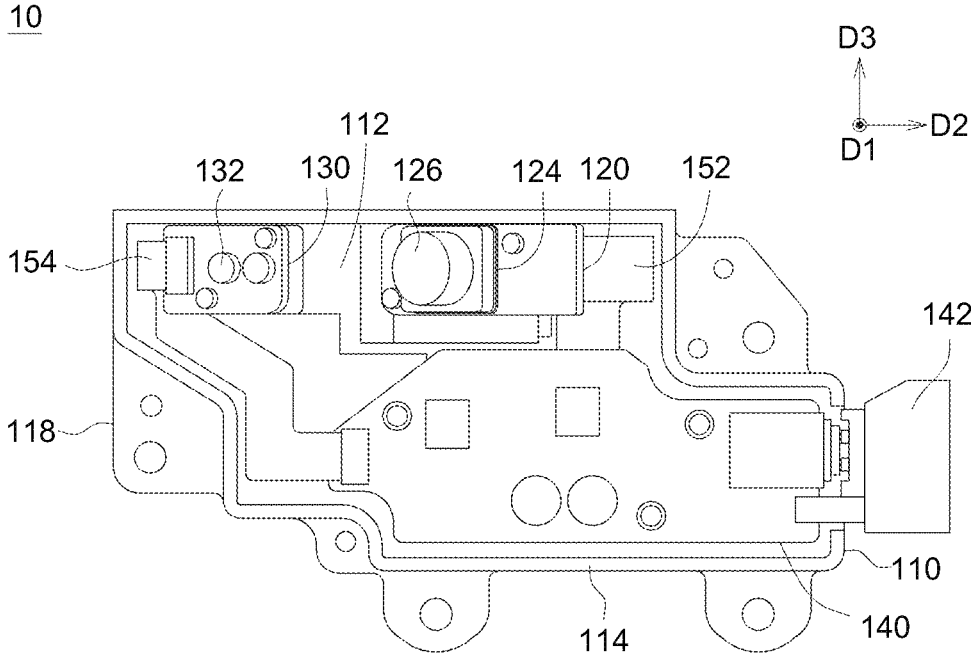
FIG. 1C shows a top view of the camera module after a second housing is opened according to an embodiment of the present invention.
Figure 1D:
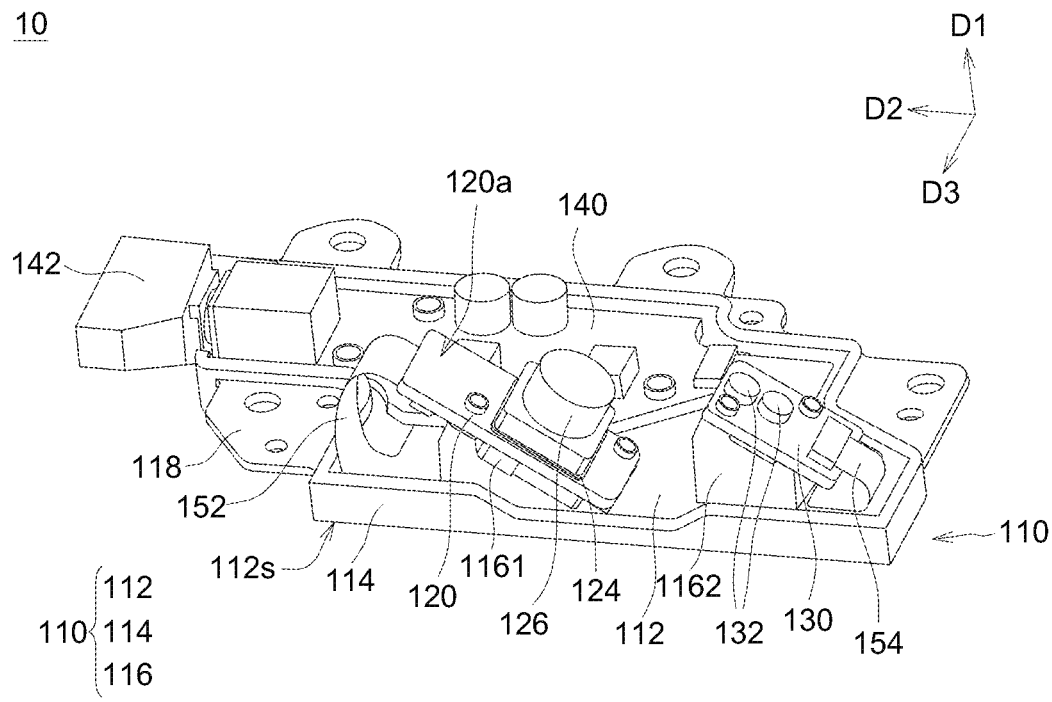
FIG. 1D is a three-dimensional view of the camera module after the second housing is opened according to an embodiment of the present invention.
Figure 1E:
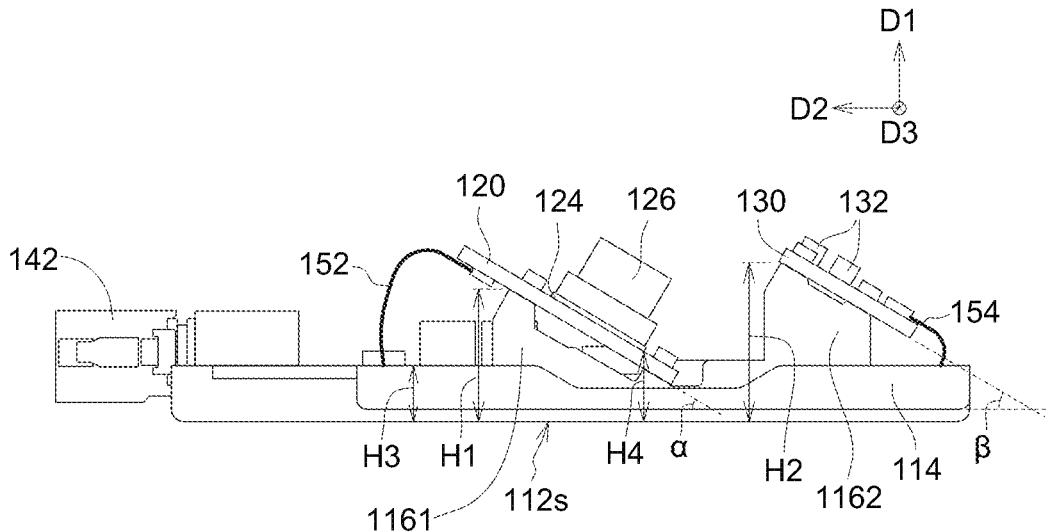
FIG. 1E shows a side view of the camera module after the second housing is opened according to an embodiment of the present invention.

FIG. 1A shows an exploded view of a camera module 10 according to an embodiment of the present invention. FIG. 1B is a three-dimensional view of a camera module 10 according to an embodiment of the present invention. FIG. 1C shows a top view of the camera module 10 after a second housing 160 is opened according to an embodiment of the present invention. FIG. 1D is a three-dimensional view of the camera module 10 after the second housing 160 is opened according to an embodiment of the present invention. FIG. 1E shows a side view of the camera module 10 after the second housing 160 is opened according to an embodiment of the present invention.

Referring to FIG. 1A, the camera module 10 includes a housing 100, a first circuit board 120, a lens 126, a second circuit board 130, and light-emitting elements 132. The housing 100 includes a first housing 110 and a second housing 160. The second housing 160 and the first housing 110 are assembled, and are, for example, engaged and fixed with each other or locked with screws.

Please refer to FIGS. 1A to 1E. The first housing 110 includes a body portion 112, a first protruding portion 1161, a second protruding portion 1162, an edge portion 114 and an extension portion 118. The body portion 112, the first protruding portion 1161, the second protruding portion 1162, the edge portion 114 and the extension portion 118 are integrally formed. That is, the entire first housing 110 is an integral structure. As shown in FIGS. 1A, 1C to 1E, the first protruding portion 1161 is provided on an inner side 112A of the body portion 112, and an outer side 112B of the body portion 112 is used for mounting to an object (for example, any object inside a vehicle, such as an air-conditioning vent, dashboard, interior rearview mirror, etc.), the inner side 112A is opposite to the outer side 112B. The second protruding portion 1162 is disposed in the inner side 112A of the body portion 112. The second protruding portion 1162 is, for example, around the first protruding portion 1161, allowing the light-emitting elements 132 to achieve a supplementary lighting effect, Meanwhile, the adhesive layer 124 (detailed below) is completely exposed, and the field of view of the lens 126 is not reduced. The edge portion 114 is disposed on the periphery of the body portion 112, for example, directly connected to the body portion 112. The first protruding portion 1161, the second protruding portion 1162 and the edge portion 114 protrude toward the inner side 112A, for example, such that a distance between a top portion of the first protruding portion 1161 and the mounting surface 112s, a distance between a top portion of the second protruding portion 1162 and the mounting surface 112s and a distance between a top portion of the edge portion 114 and the mounting surface 112s are all greater than 0. The first protruding portion 1161 has a first inclined surface 1161a at the top portion of the first protruding portion 1161, and the second protruding portion 1162 has a second inclined surface 1162a at the top portion of the second protruding portion 1162. The first inclined surface 1161a and the second inclined surface 1162a are non-parallel to the mounting surface 112s, and the first inclined surface 1161a and the second inclined surface 1162a may respectively be an uneven surface (that is, have a concave and convex contour). The extension portion 118 is connected to the edge portion 114, for example. The extension portion 118 may have a plurality of holes through which fixing elements SC (such as screws) can be used to install the camera module 10 on an object.

As shown in FIGS. 1A and 1C to 1E, the first circuit board 120 is disposed on the first protruding portion 1161. For example, the first circuit board 120 is installed on the first inclined surface 1161a of the first protruding portion 1161 (for example, using screws to lock), so that a first surface 120a of the first circuit board 120 is non-parallel to the mounting surface 112s. A first angle α is between the first circuit board 120 and the mounting surface 112s, and the first angle α is greater than 0 degrees and less than 90 degrees. In other words, the first circuit board 120 can be disposed on the first inclined surface 1161a of the first protruding portion 1161 to form the first angle α. In one embodiment, the first inclined surface 1161a includes a protrusion, and the first circuit board 120 can be attached to the protrusion. In one embodiment, at least a portion of the first circuit board 120 may directly contact the first inclined surface 1161a (such as the protrusion of the first inclined surface 1161a), but the invention is not limited thereto. A photo sensor 122 is disposed on the first surface 120a of the first circuit board 120. The lens 126 may be disposed on the first surface 120a of the first circuit board 120 and corresponds to the photo sensor 122. For example, the lens 126 is disposed on the photo sensor 122 so that the optical axis of the lenses in the lens 126 can be aligned with the center of the photo sensor 122. An adhesive layer 124 is disposed between the lens 126 and the first circuit board 120. The lens 126 is fixed on the first surface 120a of the first circuit board 120 through the adhesive layer 124. In one embodiment, the adhesive layer 124 includes a light-curable adhesive. For example, the adhesive layer 124 needs to be irradiated with ultraviolet light through an irradiation step to cure the adhesive layer 124. Therefore, the structure around the adhesive layer 124 is kept as unobstructed as possible to complete the irradiation step. The lens 126 and the light-emitting element 132 can be disposed in exchanged positions, that is, the lens 126 is disposed on the first protruding portion 1161 and the light-emitting elements 132 are disposed on the second protruding portion 1162.

For example, please refer to FIG. 1E, a height H1 of a top portion of the first protruding portion 1161 in a first direction D1 and a height H2 of a top portion of the second protruding portion 1162 in the first direction D1 are both greater than a height H3 of a top portion of the edge portion 114 in the first direction D1. The first direction D1 is parallel to a normal direction of the mounting surface 112s. Furthermore, the height H3 of the top portion of the edge portion 114 in the first direction D1 is less than a minimum height H4 of the adhesive layer 124 in the first direction D1. Through the height design of the first protruding portion 1161, the second protruding portion 1162, the edge portion 114 and the adhesive layer 124, the adhesive layer 124 is less likely to be blocked by other structures (such as the edge portion 114), so that the photo-curing to the adhesive layer 124 will not be affected, and the lens 126 is firmly adhered to the first circuit board 120.

As shown in FIGS. 1A, 1C to 1E, the second circuit board 130 is disposed on the second protruding portion 1162, for example, the second circuit board 130 is installed on the second inclined surface 1162a of the second protruding portion 1162 (for example, using screws to lock), so the second surface 130a of the second circuit board 130 is non-parallel to the mounting surface 112s. A second angle β is formed between the second circuit board 130 and the mounting surface 112s, and the second angle β is greater than 0 degrees and less than 90 degrees. In other words, the second circuit board 130 may be disposed on the second inclined surface 1162a of the second protruding portion 1162 to form the second angle β. Furthermore, the light-emitting elements 132 are disposed on the second surface 130a of the second circuit board 130. In FIGS. 1A and 1C to 1E, the number of light-emitting elements 132 is two. However, the present invention is not limited thereto. The number of light-emitting elements 132 may be one or more than two. The light-emitting elements 132 are, for example, light-emitting diodes or other suitable light-emitting element. The light-emitting elements 132 can be used to supplement the light within the field of view (FOV) of the lens 126, so that the lens 126 has excellent shooting effects. In the present embodiment, the first angle α is equal to the second angle β, that is, the first circuit board 120 is parallel to the second circuit board 130, so that the light-emitting elements 132 can exert the best effect of supplementing light.

In addition, compared with the comparative example in which the first circuit board and the second circuit board are both parallel to the mounting surface, since the first angle α between the first circuit board 120 and the mounting surface 112s and the second angle β between the second circuit board 130 and the mounting surface 112s in the camera module 10 are both greater than 0 degrees and less than 90 degrees, the first circuit board 120 and the second circuit board 130 are tilted, the space can be saved, which is beneficial to the installation of the camera module 10 in the miniature design. Preferably, the angle range of the first angle α and the second angle β is between greater than 0 degrees and less than 60 degrees (i.e. 0°<α<60°, 0°<β<60°), or between greater than 0 degrees and less than or equal to 60 degrees (i.e., 0°<α≤60°, 0°<β≤60°) to prevent the first protruding portion 1161 from blocking the field of view (FOV) of the camera module 10.

In some camera modules of comparative examples, a calibration device is first used to adjust the position of the optical axis of the lenses in the lens relative to the photo sensor on the circuit board. After the positions of the lenses and the photo sensors are adjusted vertically, the lenses and the photo sensor are fixed to the same component (for example, fixing the lens including the lenses and the circuit board having the photo sensor as the same component), and then integrating the light-supplementing component and the main control board into a complete camera module. However, due to limitations in the viewing angle or field of view (FOV) of the lens, in order to comply with the space design constraints of different environments in vehicles, additional external components need to be added to meet the requirements for changing the optical axis of the lens (such as deflection). In the embodiment of the camera module 10, the integrally formed first housing 110 allows a first angle α formed between the first circuit board 120 with the lens 126 thereon and the mounting surface 112s. The first angle α is considered for the viewing angle (FOV) requirement of the lens 126. Such requirement to change the optical axis (such as deflection) of the lenses (not shown) in the lens 126 can be achieved through the design of the inherent first angle α in the camera module 10 when the camera module 10 is installed on an object (such as a vehicle). That is, additional external components to change the optical axis are not required. Therefore, compared with the comparative example in which additional external components are added to adjust the angle of the optical axis, the camera module 10 can have a compact size, which meets the demand for miniaturization, such as the need to minimize the space inside the vehicle for assembly. Moreover, the camera module 10 does not require the user to manually adjust its angle through external components on the vehicle, so that the user can enjoy a more convenient use experience. In addition, the adjustment for the position of the optical axis between the lenses and the photo sensor 122 of the camera module 10 can be corrected at the same time after being assembled to the housing 100 (such as the first housing 110), thereby reducing the accumulation of component tolerances and improving the accuracy of the finished product of the camera module 10.

Referring to FIGS. 1A, 1C and 1D, the camera module 10 further includes a third circuit board 140, a first transmission member 152 and a second transmission member 154. The third circuit board 140, the first transmission member 152 and the second transmission member 154 are all disposed in the inner side 112A of the body portion 112. The first transmission member 152 is electrically connected to the first circuit board 120 and the third circuit board 140. The second transmission member 154 is electrically connected to the second circuit board 130 and the third circuit board 140. In the present embodiment, the first transmission member 152 and the second transmission member 154 are respectively flexible circuit boards, but the present invention is not limited thereto. The third circuit board 140 is, for example, a main circuit board used to control the first circuit board 120 and the second circuit board 130. In the present embodiment, a connector 142 is electrically connected to the third circuit board 140 and a center console (not shown) on the vehicle, but the invention is not limited thereto. In other embodiments, the third circuit board 140 and the center console (not shown) on the vehicle may be electrically connected to each other using wires (not shown) instead of being electrically connected to each other through the connector 142.

Referring to FIGS. 1A and 1B, the housing 100 further includes a second housing 160, which is assemble with the first housing 110, and the second housing 160 has openings 162 and 164 respectively corresponding to the lens 126 and the light-emitting elements 132. The openings 162 and 164, for example, expose the lens 126 and the light-emitting elements 132 respectively. Moreover, the camera module 10 further includes filters CF1 and CF2. The filters CF1 and CF2 cover the openings 162 and 164, respectively. That is, the filters CF1 and CF2 can overlap the lenses 126 and the light-emitting elements 132 in the first direction D1, respectively. The filters CF1 and CF2 are, for example, infrared filters, which can be used to filter out the light from the outside of the camera module 10, but the invention is not limited thereto. In other embodiments, the second housing 160 has a single opening and a single filter corresponding to the lens 126 and the light-emitting elements 132, that is, the single opening exposes the lens 126 and the light-emitting elements 132, and the single filter covers the lens 126 and the light-emitting elements 132. This single opening allows this single filter to overlap the lens 126 and the light-emitting elements 132 respectively in the first direction D1.

Figure 2:
FIG. 2 shows a side view of a camera module after a second housing is opened according to another embodiment of the present invention.
Figure 2:
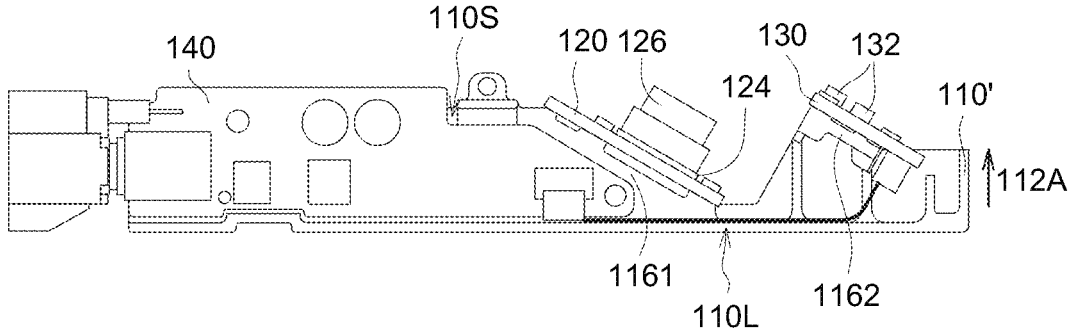

In the present embodiment, the third circuit board 140, the first protruding portion 1161 and the second protruding portion 1162 for respectively carrying the first circuit board 120 and the second circuit board 130 in the camera module 10 are disposed on the same surface of the first housing 110, but the invention is not limited thereto. In other embodiments, the first housing 110' may include a side surface 110S and a lower surface 110L connected to each other, wherein the angle between the side surface 110S and the lower surface 110L is, for example, 90 degrees, and the third circuit board 140 is, for example, disposed on the side surface 110S of the first housing 110', as shown in FIG. 2; the first protruding portion 1161 and the second protruding portion 1162 carrying the first circuit board 120 and the second circuit board 130 are, for example, disposed in the inner side 112A of the first housing 110'.

Figure 3:
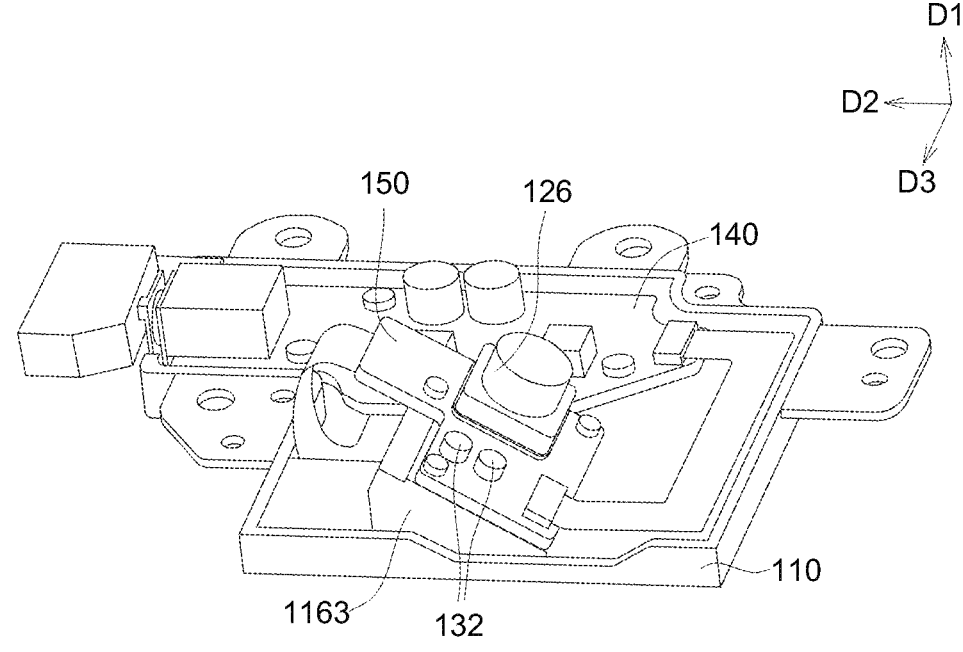
FIG. 3 is a three-dimensional view of the camera module after the second housing is opened according to a further embodiment of the present invention.

In the present embodiment, the first protruding portion 1161 and the second protruding portion 1162 are disposed on the first housing 110 along the second direction D2 (that is, the first protruding portion 1161 and the second protruding portion 1162 are sequentially disposed in the second direction D2), the first protruding portion 1161 overlaps the third circuit board 140 in the third direction D3. The second direction D2 and the third direction D3 are, for example, parallel to the mounting surface 112s, and the first direction D1, the second direction D2 and the third direction D3 are perpendicular to each other, but the present invention is not limited thereto. The position design of the first protruding portion 1161, the second protruding portion 1162, the third circuit board 140 and other structures can be adjusted according to needs. For example, the first protruding portion 1161 and the second protruding portion 1162 may be disposed in parallel along the third direction D3, or the first protruding portion 1161 and the second protruding portion 1162 may be integrated into a single inclined protruding portion 1163, as shown in FIG. 3, in which the lens 126 and the light-emitting elements 132 can be disposed on the same protruding portion 1163 and disposed on the same circuit board 150; the lens 126 and the light-emitting elements 132 can also be disposed on two protruding portions and disposed on two circuit boards (not shown). The above arrangement can prevent the field of view (FOV) of the lens 126 from being blocked by the protruding portion.

According to an embodiment of the present invention, a camera module 10 is provided. The camera module 10 includes an integrally formed first housing 110. The first circuit board 120 is disposed on the first protruding portion 1161 in the first housing 110. The lens 126 is disposed on the first circuit board 120. Accordingly, an optical axis with the adjusted angle of the lens that meets the requirements for the user's viewing angle can be obtained through the first angle α formed by a circuit board 120 on the first protruding portion 1161. Therefore, compared with the comparative example in which additional external components are added to adjust the angle of the optical axis, the camera module 10 can have a compact design to meet the requirement of miniaturization. Furthermore, the camera module 10 does not require the user to manually adjust the angle through external components on the vehicle, so that the user can enjoy a better use experience. In addition, the adjustment of the position of the optical axis between the lenses in the lens 126 and the photo sensor 122 of the camera module 10 can be calibrated at the same time after being assembled to the housing 100, which can reduce the accumulation of component tolerances and improve the accuracy of the finished product of the camera module 10. In addition, compared with the comparative example in which the first housing 110 is assembled from multiple components, since the first housing 110 of the present invention is an integrally formed structure, it can save time spent in assembling, and the tolerances resulted from assembling can also be reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A camera module, comprising:
a housing comprising a first housing, the first housing comprising a body portion and a first protruding portion, and the body portion and the first protruding portion integrally formed, wherein the first protruding portion is disposed in an inner side of the body portion, an outer side of the body portion is a mounting surface for mounting to an object, and the inner side is opposite to the outer side;
a first circuit board disposed on the first protruding portion, a photo sensor disposed on a first surface of the first circuit board, wherein a first angle is formed between the first circuit board and the mounting surface, the first angle is greater than 0 degrees and less than 90 degrees; and
a lens disposed on the first surface of the first circuit board and corresponding to the photo sensor;
wherein the first housing further comprises a second protruding portion, the second protruding portion is disposed in the inner side of the body portion, the second protruding portion and the body portion are an integral structure, and the camera module further comprises:
a second circuit board disposed on the second protruding portion, wherein a second angle is formed between the second circuit board and the mounting surface, the second angle is greater than 0 degrees and less than 90 degrees; and
a light-emitting element disposed on the second circuit board.

2. The camera module according to claim 1, wherein the first angle is equal to the second angle.

3. The camera module according to claim 1, wherein the first housing further comprises an edge portion disposed on a periphery of the body portion and a distance between a top portion of the edge portion and the mounting surface is greater than 0.

4. The camera module according to claim 3, wherein a height of a top portion of the first protruding portion in a first direction and a height of a top portion of the second protruding portion in the first direction are greater than a height of the top portion of the edge portion in the first direction, and the first direction is parallel to a normal direction of the mounting surface.

5. The camera module according to claim 3, wherein the edge portion and the body portion are an integral structure.

6. The camera module according to claim 1, wherein the first circuit board is disposed on a first inclined surface of the first protruding portion to form the first angle; the second circuit board is disposed on a second inclined surface of the second protruding portion to form the second angle.

7. The camera module according to claim 1, further comprising an adhesive layer disposed between the lens and the first circuit board, wherein the lens is fixed on the first surface of the first circuit board through the adhesive layer.

8. The camera module according to claim 7, wherein the adhesive layer comprises a light-curable adhesive.

9. The camera module according to claim 7, wherein the first housing further comprises an edge portion disposed on a periphery of the body portion, a height of a top portion of the edge portion in a first direction is less than a minimum height of the adhesive layer in the first direction, and the first direction is parallel to a normal direction of the mounting surface.

10. The camera module according to claim 1, further comprising:
a third circuit board disposed in the inner side of the body portion;
a first transmission member electrically connected to the first circuit board and the third circuit board; and
a second transmission member electrically connected to the second circuit board and the third circuit board.

11. The camera module according to claim 10, wherein the first transmission member and the second transmission member are flexible circuit boards.

12. The camera module according to claim 1, wherein the housing further comprises a second housing assembled with the first housing, and the second housing has an opening corresponding to the lens.

13. The camera module according to claim 12, further comprising a filter covering the opening.

14. A camera module, comprising:
a housing comprising a first housing, the first housing comprising a body portion and a single inclined protruding portion, and the body portion and the single inclined protruding portion integrally formed, wherein the single inclined protruding portion is disposed in an inner side of the body portion, an outer side of the body portion is a mounting surface for mounting to an object, and the inner side is opposite to the outer side;
a circuit board disposed on an inclined surface of the single inclined protruding portion;
a photo sensor disposed on a surface of the circuit board, wherein an angle is formed between the inclined surface of the single inclined protruding portion and the mounting surface, the angle is greater than 0 degrees and less than 90 degrees;
a lens disposed on the surface of the circuit board and corresponding to the photo sensor; and
a light-emitting element disposed on the surface of the circuit board,
wherein the lens and the light-emitting element are mounted on the circuit board disposed on the single inclined protruding portion.

* * * * *